July 15, 1952  J. H. HOMRIGHOUS  2,603,780
DISTANT CONTROL SYSTEM
Original Filed Aug. 3, 1940    5 Sheets-Sheet 2
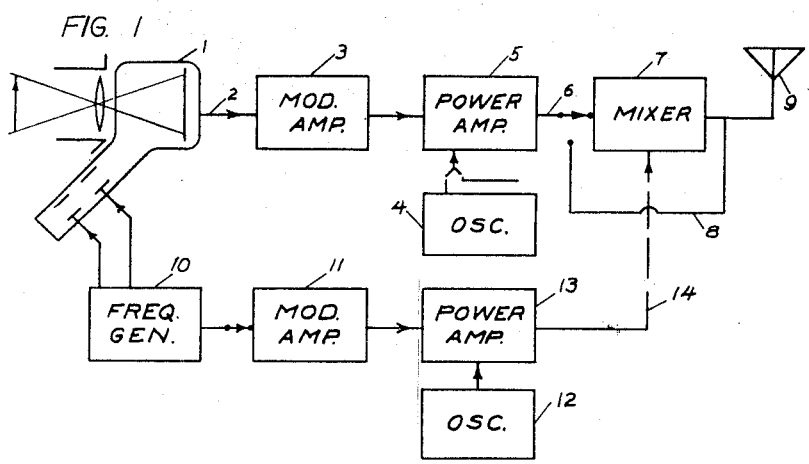
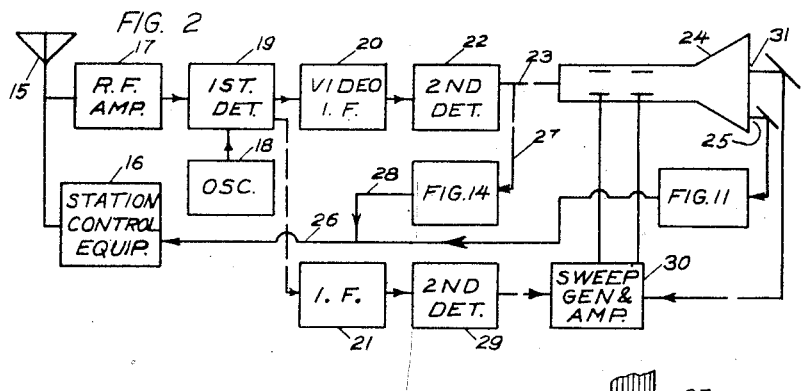
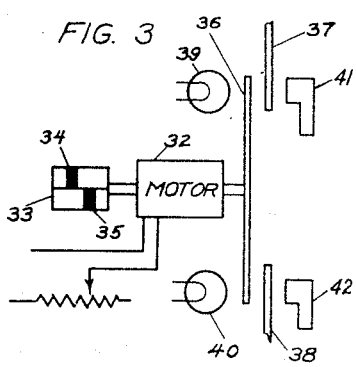
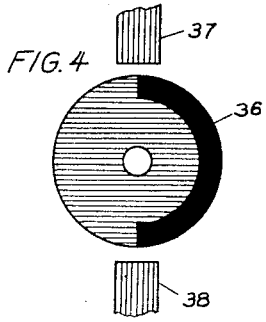
INVENTOR.
John H. Homrighous July 15, 1952   J. H. HOMRIGHOUS   2,603,780
DISTANT CONTROL SYSTEM
Original Filed Aug. 3, 1940   5 Sheets-Sheet 3
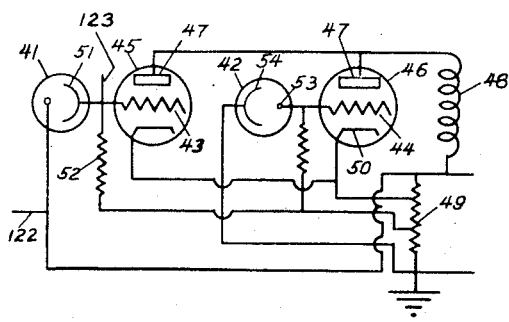
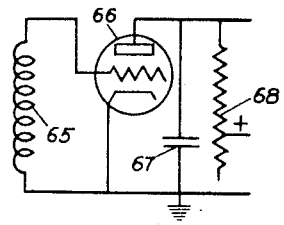
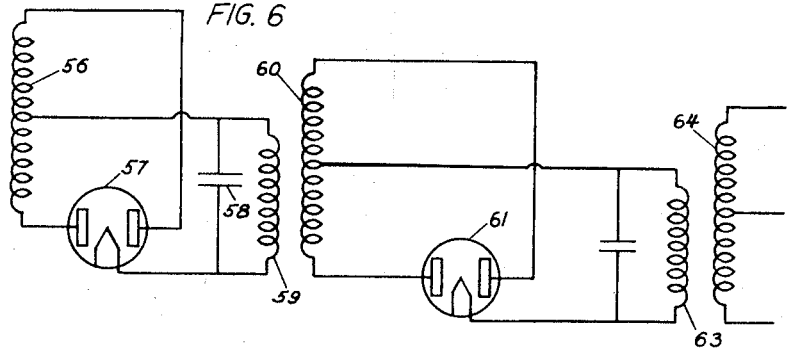
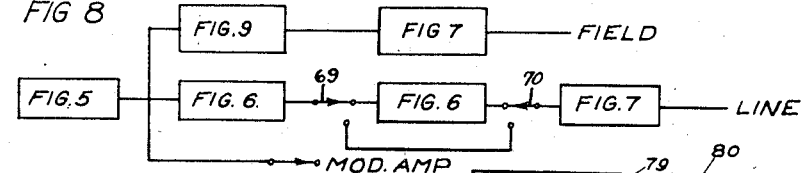
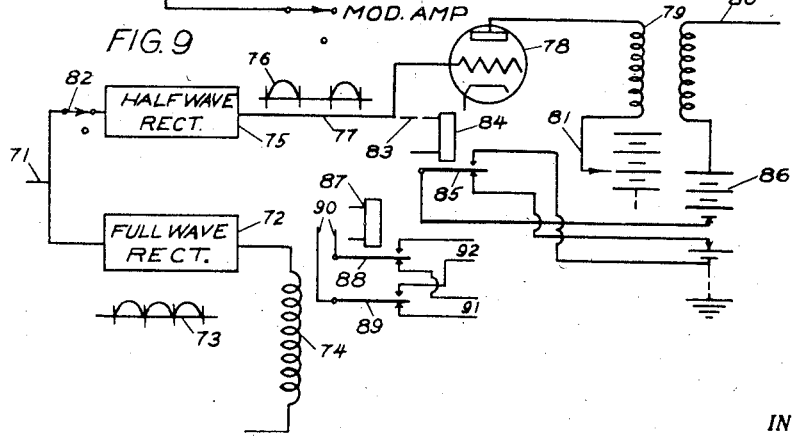
INVENTOR.
John H. Homrighous July 15, 1952  J. H. HOMRIGHOUS  2,603,780
DISTANT CONTROL SYSTEM
Original Filed Aug. 3, 1940  5 Sheets-Sheet 4
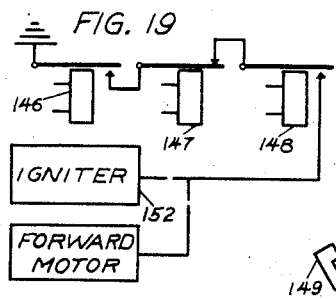
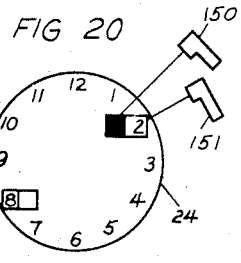
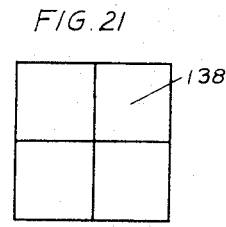
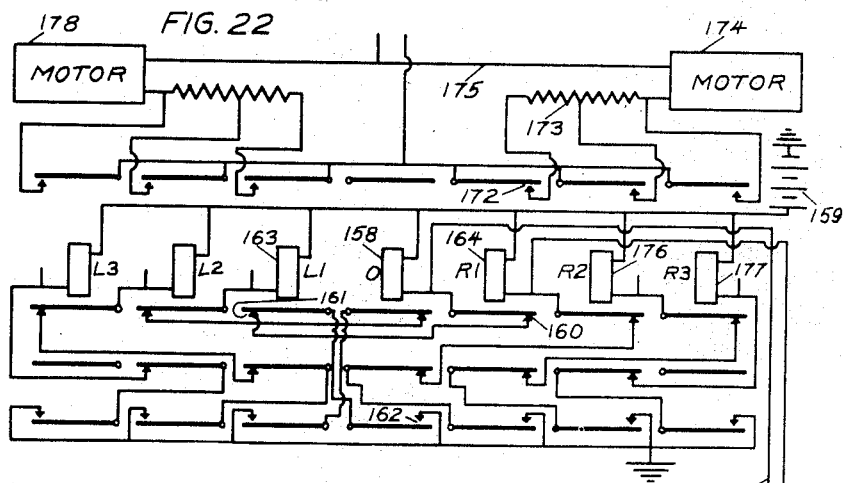
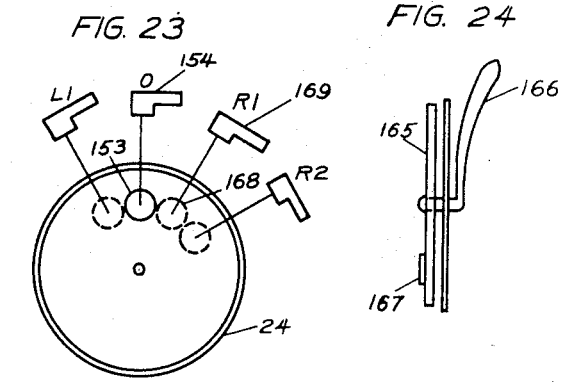
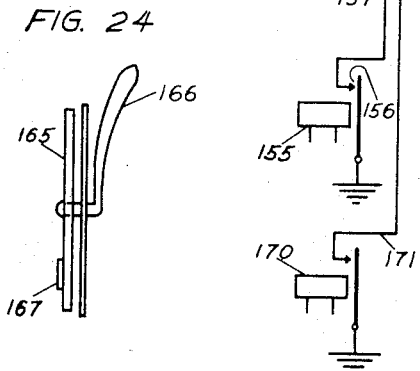
INVENTOR.
John N. Homrighous July 15, 1952     J. H. HOMRIGHOUS     2,603,780
DISTANT CONTROL SYSTEM
Original Filed Aug. 3, 1940     5 Sheets—Sheet 5
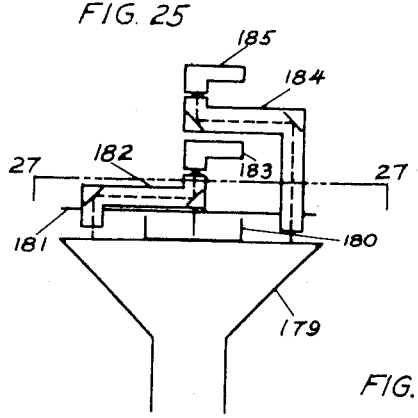
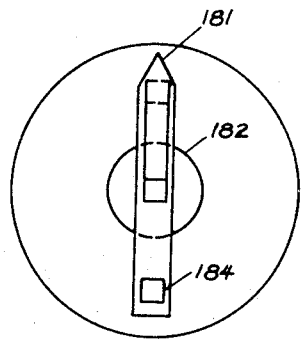
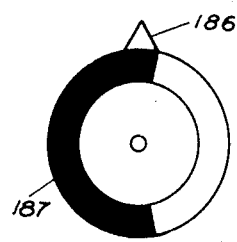
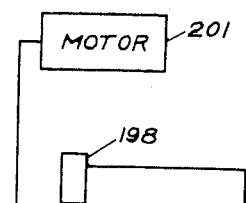
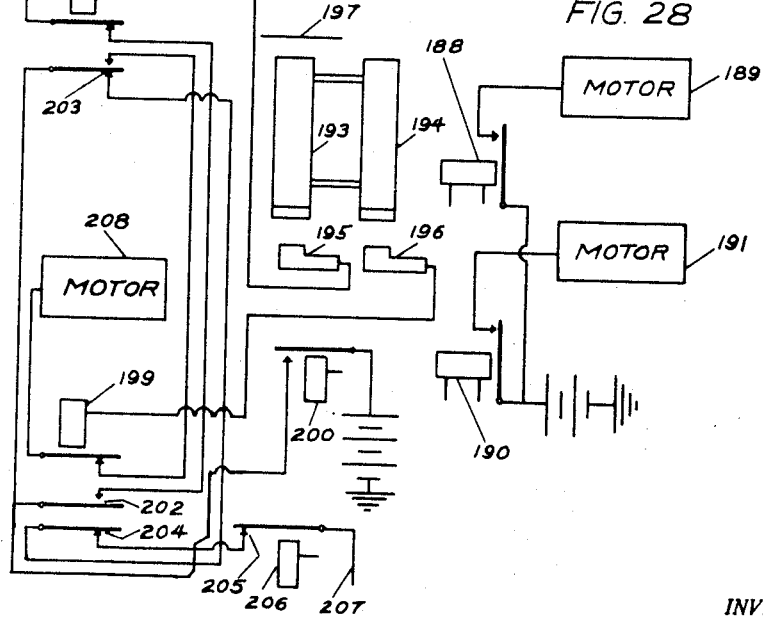
INVENTOR.
John H. Homrighous Patented July 15, 1952

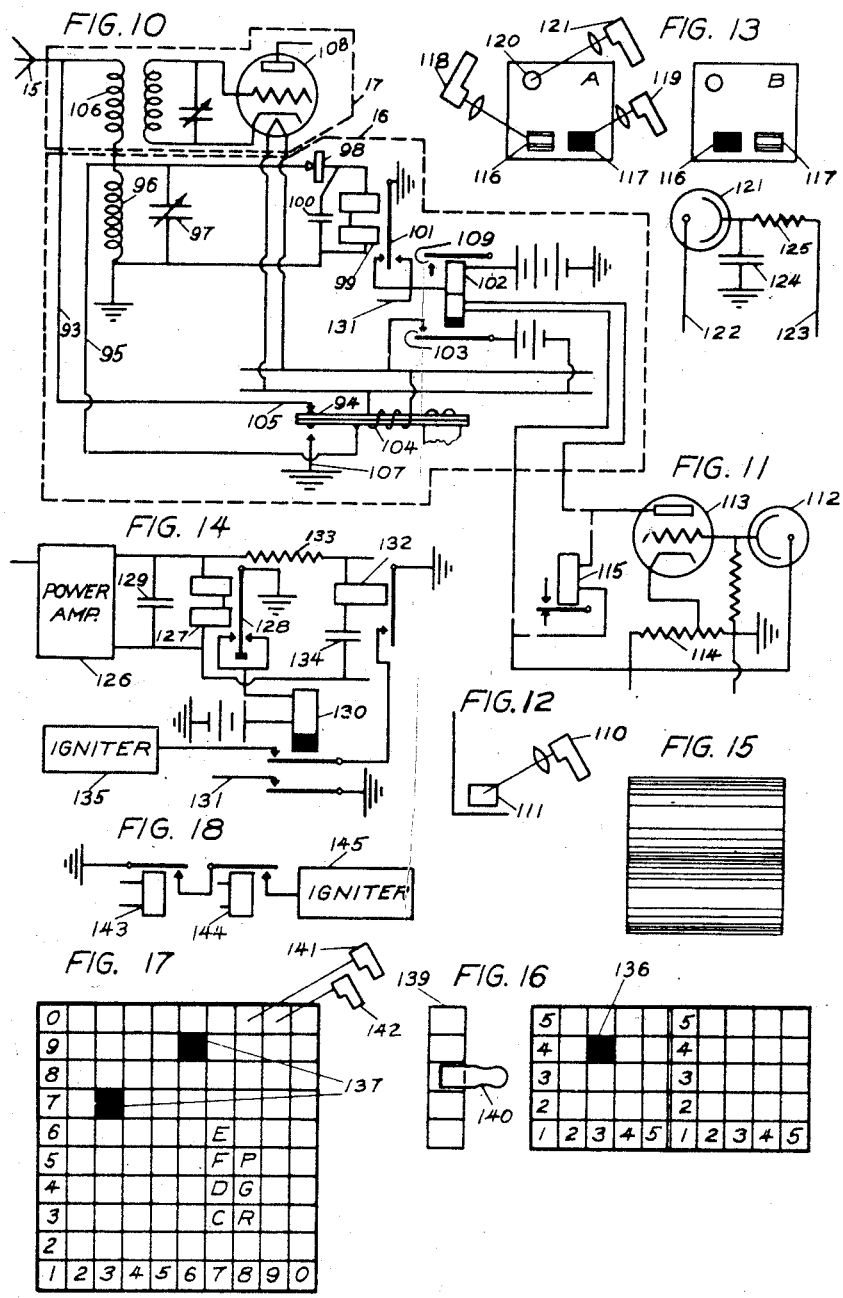

2,603,780

UNITED STATES PATENT OFFICE 2,603,780

DISTANT CONTROL SYSTEM

John H. Homrighous, Oak Park, Ill.

Application April 26, 1943, Serial No. 484,570, which is a division of application Serial No. 350,758, August 3, 1940. Divided and this application September 5, 1946, Serial No. 695,006

32 Claims. (Cl. 343—204)

This application is a division of application Serial Number 484,570 filed April 26, 1943, Patent No. 2,454,651 issued November 23, 1948.

My invention relates generally to an improved distant station selecting system with selection of or control of distant station equipment.

Accordingly one of the main objects is to provide an improved method and system for selecting distant stations, and for selecting different equipment in the selected station.

Another object is the provision of an improved method and system for transmitting a number of different control or code signals over a common transmission path or lane to select one or more stations and to control various equipments in the selected station.

Another object of the invention is to provide a system to control distant apparatus and devices which will cause the explosion of bombs and mines at a fixed location or in moving vehicles.

Still another object of the invention is to provide an improved system to control distant mobile vehicles such as automobiles, aeroplanes, ships, and also to control various equipments associated with the vehicles. Another object of my invention is to provide an improved method and system for guiding a vehicle toward an object and to maintain the vehicle traveling toward the object.

Another object is to provide means for transmitting two distinct and different systems of synchronizing signals, either separately or simultaneously, to control receiving stations with different synchronizing systems.

Several methods for transmitting control signals to control equipment in distant stations have been devised; one of these methods uses a code system of signals, commonly known as the Baudot code, transmitted by the aid of radio.

In my prior application, Serial No. 484,570, filed April 26, 1943, now Patent No. 2,454,651 issued November 23, 1948, I have described a system for the remote control of operable apparatus in distant receiving stations, either fixed or mobile, by transmitting signals in one or more recurring periods to control or select individually distant station apparatus.

The invention in this application may, in general, be described as a system for selecting one or more stations in a group of stations with the selection and control of different kinds of equipment in the selected stations, and for the selection at a single station of different kinds of equipment to perform an orderly sequence of operations.

This application is a division of application Serial No. 484,570, filed April 26, 1943, now Patent No. 2,454,651 issued November 23, 1948. The latter application is a division of Patent No. 2,369,783, issued February 20, 1945.

Many features shown in this application are shown and described in my Patent No. 2,309,393, issued January 26, 1943, and a division of the latter patent, Serial No. 470,039, filed December 24, 1942, now Patent No. 2,409,488, issued October 15, 1946, and also Patent 2,320,699, issued June 1, 1943, and a division of the latter patent, Patent No. 2,398,642, issued April 16, 1942. In this application I have not shown a method for transmitting and reproducing sound, but it is to be understood that either of the methods shown in the above noted patents may be used where desired between certain types of stations.

Other objects, features, and advantages of my invention will appear from the following description taken in connection with the accompanying drawings illustrating an embodiment thereof in which:

Figures 1 and 2 are simplified diagrammatic views of a television transmitting station and a television receiving station, respectively, illustrating the principles applied in this invention.

Figure 3 is a motor device for generating control frequencies.

Figure 4 is an end view of the disk shown in Figure 3.

Figures 5, 6, 7 and 9 are control circuits for scanning and interlace operations.

Figure 8 is a simplified block diagram showing circuit figure numbers used in generating the sweep frequencies.

Figure 10 shows station control apparatus and circuits.

Figure 11 is a photo-electric tube circuit.

Figures 12 and 13 show picture control characters, reproduced at the receiver, and a photo tube circuit.

Figure 14 shows selective devices responsive to certain definite frequencies.

Figure 15 shows picture characters for use at the transmitter to produce definite frequencies.

Figures 16, 17 and 20 show picture characters, or code reproduced at the receiver.

Figures 18 and 19 show circuits arranged for code operation.

Figure 21 shows an arrangement for several separate codes.

Figure 22 is a circuit for controlling the steering mechanism of mobile equipment.

Figure 23 shows an arrangement for utilizing the picture signals used in connection with Figure 22.

Figure 24 shows a device for originating picture signals at the transmitter.

Figure 25 shows mechanisms for translating picture images into electrical energy.

Figure 26 shows a control character or pattern, reproduced at the receiving tubes.

Figure 27 is a top view of the cathode ray tube and compass shown in Figure 25.

Figure 28 is a circuit used in connection with Figure 25.

Figure 29 shows automatic aligning devices.

In Figure 1, the numeral 1 designates a cathode-ray pick-up tube of the conventional type, and is known as an "Iconoscope." It is to be understood that other types of tubes may be used, such as the "Orthiconoscope," developed for perpendicular scanning of all points on the mosaic; or the tube known as the image dissector may be used instead of the one illustrated.

As shown, the tube comprises a mosaic, photoelectric screen on which a light image of the object is projected and an electron gun for generating a ray of electrons directed at the screen, and two sets of deflecting plates for deflecting the electron ray at the line and field frequencies, so that it is caused to scan the screen. It is to be understood that electromagnetic means may be employed for deflecting the electron beam. The picture and certain other control characters are thereby developed and fed by an output connector 2 to a modulating amplifier 3.

A carrier wave is provided by an oscillator 4 in the power amplifier 5. The oscillator 4 may be arranged to supply several different frequencies, or different oscillators may be switched in and out of the circuit in order that several carrier waves may be used. The carrier is modulated by the video or picture signals through the modulation amplifier 3. The signals from the amplifier 5 are supplied by a connection 6 to the mixing circuit 7. Certain control characters for governing the scanning action at the receiving set may be transmitted as video signals, which procedure is covered also in my prior Patent Number 2,309,393. When this procedure is followed the signals from amplifier 5 are supplied by the connections 6 and 8 direct to the antenna 9.

The numeral 10 designates a generator for producing pulsating voltage waves or waves of sine form for controlling the sweep frequencies at the desired frame and line frequencies. These sweep frequencies are supplied to the deflecting plates of tube 1. The sine form waves may, through the medium of amplifier 11, modulate another carrier produced by oscillator 12 in its amplifier stage 13. When it is desired by the operator to transmit a separate synchronizing frequency for controlling the scanning action at the receiver, the signals from the amplifier 13 are fed to the mixer circuit 7 through the conductor 14.

The two carrier waves, one modulated by a single control frequency, the other modulated by video signals, are mixed in the mixer circuit 7 and fed to the common antenna 9 for transmission by radio.

The control signals are transmitted in the form of sine waves which are changed or rectified at the receiving station before they are used to synchronize the scanning action with the transmitter.

The antenna 15, Figure 2, receives the carrier signals from the transmitter antenna 9 to a tuned station control equipment circuit 16. These signals may come in over a single carrier wave whenever the control voltages are to be generated from the picture signals, or two carier waves may be employed when it is desired to have the control for the sweep signals transmitted as a definite frequency on a subcarrier.

When a carrier wave modulated by a particular frequency is received, the tuned station control circuit 16 functions to switch the incoming signal from the tuned station control circuit to the radio frequency amplifier 17 and to close the battery supply to the receiving set.

An oscillator 18 reacts with these signals in the first stage 19, on the heterodyne principle, to produce a single intermediate frequency signal which is supplied to the video intermediate stage 20; and at stations operating from two carriers, the oscillator 18 reacts with these two signals in the stage 19 to produce two intermediate frequencies which are fed to the two stages 20 and 21.

After suitable amplification, the video signals are detected at 22 and fed by a connection 23 to a reproducing or picture tube 24. The device 24 is represented as being in the form of a cathode ray tube of well known construction, and comprises a fluorescent screen, an electron gun for developing a ray of electrons directed toward the screen, and two sets of electrostatic plates for deflecting the electron ray at the line and field frequencies to cause it to scan the screen. It is to be understood that electromagnetic means may be employed for deflecting the electron beam. The video signals are applied to a control electrode of the electron gun to change the intensity of the electron ray in accordance with picture or video signals.

Blanking signals may be obtained in accordance with the system shown in my prior Patent Number 2,320,699.

The picture tube 24 reproduces at 25 a certain character or a relatively bright image to produce light rays, which may be picked up by the photo-tube shown in the circuit of Figure 11, which in turn operates over connection 26 to a holding device in the station control circuit 16, whereby the apparatus will continue to be supplied with battery until such time as the transmitter either goes off the air or the image for producing the character at 25 is no longer transmitted.

In certain instances a more economical and different method of interpreting video signals is desirable, and I have provided such a device in Figure 14, to be explained more fully later. As shown in Figure 2, the device is fed from connection 27, eliminating the picture tube 24 and the necessity for sweep signals. The connection 28 is for holding the station control circuit 16 in operative condition.

The intermediate frequency stage 21 in certain instances may receive the control signals, and the action of the second detector 29 produces a voltage wave of sine form that is fed to the sweep generator and amplifier circuit 30 where, after suitable amplification, the voltage wave is changed or rectified and used to control the vertical scanning. The output voltage wave from the second detector 29 is used to produce a higher frequency, utilizing circuits similar to those used at the transmitter, for synchronizing horizontal scanning in the generator amplifier circuit 30, which process will be explained in more detail later.

The picture control characters reproduced at 31 and supplied to suitable photo-tube circuits are for generating the synchronizing frequencies at the receiving station, thereby eliminating the necessity of transmitting control frequencies. This technique will narrow the frequency band required.

Referring to Figure 3, the numeral 32 represents a motor which is operated from the local power supply and has a variable speed from approximately 1500 R. P. M. to 1800 R. P. M. or one revolution per frame. The drum 33 has two black bands 34 and 35, each of which extends over one half of the periphery and are located adjacent the opposite edges of the drum 33, which drum is directly connected to the motor shaft so that by rotating the drum 33 in front of the transmitting tube 1, two short black lines will appear alternately, but separated, on the mosaic. These lines will be reproduced at the picture tube in the receiving set as shown in Figure 13 and are used for controlling the sweep frequencies, which process will be further explained later.

Thus it will be seen that each mark or sign on the mosaic is definitely identified with a field and that each mark or sign is also definitely related to the speed of the motor, which is two fields per revolution.

Connected to the motor shaft is a disk of light polarizing material 36 revolving past stationary pieces of light polarizing material 37 and 38 and also separate sources of light 39 and 40 respectively.

The revolving and stationary members are better shown in Figure 4. The disk 36 is of polarizing material, having a certain part painted or blocked out so that by rotating disk 36 in a clockwise direction past its stationary members of polarizing material 37 and 38 and between its sources of light 39 and 40 and their respective photo-cells 41 and 42, the intensity of the light reaching each photo-cell will uniformly vary from zero value to maximum value and back to zero during one half of a revolution, and during the other half of the revolution there will be no light change.

The photo-cells 41 and 42 are placed 180 degrees apart; changes in intensity of light will alternately affect each photo-cell.

A system for producing the proper sweep frequencies is shown in Figures 5 to 9 inclusive.

Referring to Figure 5, I have shown a circuit for producing an alternating current from the variations of light occurring in the photo-cells 41 and 42, which are the photo-cells shown in Figure 3. These photo-cells control the grid excitation of grids 43 and 44 of amplifier tubes 45 and 46. The anodes 47 are connected in parallel through the primary transformer winding 48 to the positive side of voltage divider 49. The cathodes 50 are connected in parallel to an intermediate point of the voltage divider 49. The cathode 51 of photo-cell 41 is connected to the grid 43 of tube 45 and through resistance 52 to negative potential at the voltage divider, thereby maintaining the grid 43 at a negative potential with respect to cathode 50 and plate 47. The circuit is so arranged, therefore, that an increase in the intensity of light on the photo-cell 41 will increase the output current of tube 45. The photo-cell 42 has its anode 53 connected to the grid 44 of tube 46, and the anode is maintained at a positive potential with respect to its cathode 54. This circuit arrangement causes a decrease of current through tube 46 when the intensity of light directed toward the photo-cell 42 is increased. Other amplifier tubes may be connected in parallel to increase the output.

Therefore since the plate circuits of tubes 45 and 46 are in parallel, the rotation of the disk 36 will alternately operate the photo-cells 41 and 42 to produce a continuous rising and falling current in the primary winding 48 of a transformer, whereby alternating voltages are induced in the secondary winding.

When it is desired to control the receivers by a definite frequency from the transmitter, the voltage waves generated by Figure 5 are modulated on a sub carrier, as explained in connection with Figure 1, and are transmitted by radio to the receiving set to control or trigger the field and line saw tooth waves for controlling the deflection of the electron ray in the receiving tubes. These voltage waves are also used to control or trigger the line and field saw tooth waves at the transmitting tube.

In this invention I employ frequency multiplying circuits for the purpose of producing the high frequency required for horizontal line scanning. The field frequency is obtained as described above and from these frequencies the higher line frequencies are produced.

Referring to Figure 6, two stages of frequency multiplication are shown. The secondary 56 is inductively connected to the primary winding 48 in Figure 5 to supply alternating pulses to the tapped secondary and in turn to the full wave rectifier tube 57 which delivers twice the number of pulses or cycles to the tuned filter comprising the condenser 58 and the next transformer primary winding 59. This double cycle signal is supplied by the tapped secondary 60 to the full wave rectifier tube 61, where it is again doubled and fed to the succeeding transformer primary 63. The tapped secondary 64 delivers alternating current to the next stage and so on until the desired high frequency for line scanning is obtained.

In this invention I prefer to use doublers and obtain an even number of lines per field or frame, and for interlace scanning each field would have an even and equal number of lines.

From the above it will be seen that by changing the speed of the motor in Figure 3 the number of fields or frames per second would be changed but the number of lines per field would remain the same. This method will eliminate interference with local power.

To produce the desired output wave of saw tooth form or timing waves for field and line scanning, I employ a grid controlled discharge tube circuit shown in Figure 7, where voltages induced into the transformer secondary winding 65 drive the grid of tube 66 positive, discharging the condenser 67 through the tube 66. Thus by alternately charging the condenser 67 through the resistance 68 and discharging it through the tube 66, a saw tooth voltage is generated.

In Figure 8 I have shown, diagrammatically, the circuit figure numbers used to produce the required frame and line frequencies; several circuits of Figure 6 may be used, but it is to be understood that this circuit may represent only one stage.

With further reference to Figure 8, I have provided two switches 69 and 70 for shorting out one or more stages of doublers so that the horizontal lines may be varied at the will of the operator. One of the switches or keys may also change the voltage on the focusing electrode in the CR tubes to thereby change the size of the spot of electrons on the screen.

The diagrammatical arrangement of circuit figure numbers shown in Figure 8 will be the same arrangement of circuits employed at the receiver when control frequencies are developed from characters reproduced on the screen of the picture tube. However, when a sine form voltage wave is transmitted to govern the scanning action at the receiver, the schematic arrangement will be the same, except Figure 5 should be omitted.

In the present invention in order to produce interlace scanning from a sine form voltage wave it is necessary to identify every other field and in some manner cause the horizontal lines of one field to fall in between the lines produced in the second field, or the lines of one field are even numbered and in the second field they are odd numbered.

In order to accomplish the interlace features noted above, I employ the circuit shown in Figure 9. In this circuit voltage waves of sine form are supplied from the circuit of Figure 5 or are transmitted to the receiving set, as previously explained in connection with Figure 2, over the conductor 71 to a full wave rectifier 72 of conventional design. The output wave form is shown at 73. These pulses are fed through the primary winding 74 of a transformer to the wave forming circuit Figure 7, to drive the grid of tube 66 positive, discharging condenser 67, thereby producing saw tooth waves for vertical scanning.

These circuits are so arranged that the timing or synchronizing pulses are also the trigger pulses for the discharge tube, whereby the retrace is initiated.

In parallel with the full wave rectifier 72 is a half wave rectifier 75, having an output wave form as shown at 76. The pulses from the rectifier 75 are supplied by connection 77 to an amplifier 78, the output of which is connected through a transformer winding 79 to battery. These pulses will induce in the secondary a voltage which will alter the potential in conductor 80 from that furnished by the battery 86 for the duration of each pulse. The lead 80 supplies potential to one of the vertical deflecting plates of the cathode ray tube 24, Figure 2, through a variable resistance (not shown) for centering or adjusting the vertical movement of the electron spot. Another lead from the battery 86 would supply potential to the opposite vertical deflecting plate through another resistance. The potential on the plate of amplifier 78 is adjustable at 81, depending upon the space between even or odd lines.

The half wave rectifier 75 and the amplifier 78 will operate during each positive pulse to increase or decrease the potential on one of the vertical deflecting plates without changing the potential on the opposite deflecting plate, which change will have the effect of raising or lowering the horizontal lines.

From the above description it will be seen that I have provided means for interlace scanning or for shifting the position of the horizontal lines scanned in a cathode ray tube, during alternate field pulses, eliminating any necessity of transmitting by radio synchronizing pulses, other than one sine form wave of field frequency.

From the above description it will be seen that the line pulses are definitely locked with the field pulses, or in other words, the same pulse that triggers the vertical deflection also, through multiplying circuits, supplies the trigger pulses for line scanning.

Furthermore, from the above description, the control of the field and line deflecting circuits at the receiver from the sine form voltage wave transmitted by radio from the transmitting station will cause the cathode ray or electron ray in the viewing tube to be in exact synchronization with the cathode ray in the pick-up tube whenever the receiving station is tuned to the proper carrier wave.

At any time or instant that the receiver is tuned to the same carrier wave of the transmitting station, the deflecting circuits will automatically be in step. Suppose that at a certain instant the cathode ray or electron ray in the pick-up tube is focused on mid-point of a certain line on the screen of the camera tube. Now, since a single frequency or control voltage wave generated at the transmitter station times the deflection of both the field and the horizontal lines at both the transmitting station and receiving station, the cathode ray at the viewing tube would automatically be focused at the mid-point of a similar line on the screen of the viewing tube, and furthermore, since I have provided through the medium of a half wave rectifier, Figure 9, means for associating the positive pulse in each cycle of the control voltage wave with a certain field, the focused electron ray in each tube would also fall in the proper vertical location in each field. The picture or symbols produced from this system will be approximately as high as they are wide since there is very little need of reserving space at the bottom of the picture for synchronizing pulses.

With further reference to Figure 9, the switch or key 82 is thrown to off position whenever it is desired to send pictures or symbols by progressive scanning, in which case there would be no need for changing the position of the horizontal lines in the fields.

In some cases it may be desirable to operate the movement of the electron beam at a slow rate, and for that purpose I have provided at the receiver an optional feature, or the positive pulses from the connection 77, Figure 9, are fed through connection 83 to a relay 84 instead of going through the tube 78. This relay 84 operates its spring 85 upon receiving a positive pulse to change the potential of the battery 86, which battery is supplied to one of the vertical deflecting plates through a variable centering resistance and, as previously explained in connection with the tube 78, this potential change causes the lines of one field to fall in between the lines of a second field.

With reference to this relay 84, it may be used for an entirely different purpose and, as shown by the reference numeral 87, this relay 84 operates the springs 88 and 89 to switch the incoming circuit 90 from one outgoing circuit 91 to a second outgoing circuit 92 which will be explained in more detail later.

From the preceding explanation it will be seen that many combinations may be derived; for instance, at certain predetermined time intervals during the day messages or pictures may be transmitted by progressive scanning; at other time intervals interlace scanning may be used. The field frequency may be changed from slow to fast and vice versa at the option of the operator at the transmitting station; also the number of lines per field may be changed at predetermined intervals.

Referring to Figure 10, I have shown a station control stand-by circuit, or in other words, a circuit that will operate only when the proper carrier wave is received; normally this circuit is without battery drain. The modulated carrier is received from the antenna 15 over conductor 93, spring 94, conductor 95 to the receiving tuned station circuit consisting of the following equipment: an antenna coil 96 and condenser 97 which may be adjusted for various carriers, and a crystal detector 98 which may be a tube detector provided with a power supply. After detection the signals are supplied to a relay or auxiliary device 99, which operates in the low or audio frequency range and may be similar to the one shown in my prior application Patent No. 1,460,814. The number 100 represents a by-pass condenser.

The carrier at the transmitter is first modulated by a particular frequency for a short interval of time. The method of modulation will be more fully explained later. The duration of this preliminary frequency will actuate the spring 101 and close the circuit to the slow acting relay or switching device 102. The relay 102, in operating its springs 103, closes the battery supply circuit to all the tube filaments in this receiving set, and also to the heating element 104 for controlling the bimetal spring 94. The relay 102 will remain energized through the action of spring 101 during the interval of the low frequency modulation or until such time as the bimetal spring becomes sufficiently heated from its element 104, to deflect and open the circuit to the antenna coil 96, at follow up spring 105 and to place ground on the antenna coil 106 through the closing of springs 94 and 107.

The operation of the bimetal spring 94 to switch antenna coils from coil 96 to coil 106 is slow in order to allow some time for the filaments of the several receiving tubes (one tube shown at 108) to become sufficiently heated for proper operation. At the time of the switch over, the preliminary frequency received over the antenna should be ended and video signals for code operation and other controls should be received from the antenna on the same or a different carrier and developed in the receiving set equipment.

The operation of relay 102 also closes the B battery supply to the anode circuits for the several receiver tubes at springs 109. The relay 102 must remain in an operated position during the transmission of video signals. One method used to accomplish this feature is to provide a photocell 110 Figure 12 to pick up a beam of light at a particular spot or location on the screen of the viewing tube, as shown at 111. This spot or point 111 is under the control of the operator at the transmitter and may be produced from one of the marks on the drum 33 Figure 3, or it may be produced in a manner to be described in connection with Figures 16 and 17. Referring to Figure 11, I have shown a photocell 112, which may be the photocell 110 in Figure 12. This cell is responsive to variations of light intensities and current will flow when exposed to a steady beam of light of sufficient intensity. Light directed toward the photocell will change the grid potential of amplifier tube 113. The anode of tube 113 is connected through the lower winding of relay 102 to the positive terminal of the voltage divider 114. Therefore a steady light on the spot 111 directed toward the photocell 112 will cause current to flow in the lower winding of relay 102, thereby maintaining the relay operated as long as the spot 111 remains illuminated. To release the receiving set all that is required is to transmit signals to make the spot 111 dark, which effect will release the relay 102 and also render the receiving station inoperative until it is again signaled, as previously described.

The anode of tube 113 may be connected through the winding of another relay 115 instead of a winding of relay 102. The spot 111 may be placed at different locations on the tubes of different receiving sets so that any one of a number of receiving sets operating on the same carrier may be released independently of the other receiving sets. By keeping the spot 111 dark for a short or indefinite interval the relay 102 will release, opening the battery supply to the various tubes.

With reference to Figure 13 I have shown two fields, A and B, reproduced at the viewing tube showing control characters or marks 116 and 117. These marks or characters are produced by rotating the drum 33 Figure 3 in front of the transmitting tube. The marks 116 and 117 will alternate from light to dark and back to dark again, or the mark 116 field A will be light and in field B it will be dark while mark 117 is the reverse from this, or at the time of field A mark 117 will be dark while mark 116 will be light.

Light from these characters 116 and 117 is directed through suitable lenses to photo-cells 118 and 119 respectively, which may be the photocells 41 and 42 shown in the circuit of Figure 5. These photocells will operate in the circuit of Figure 5 to alternately increase and decrease the current in the primary winding 48 as previously described, whereby the field and horizontal line scanning frequencies are produced at the receiving stations using the figure numbers as shown in Figure 8.

In my prior application Patent No. 2,309,393, the characters for producing synchronizing frequencies were developed at the rate of picture or frame frequency instead of as shown and described in this application of having the characters developed at the rate of field frequency.

With further reference to Figure 13, some means must be provided for automatically starting the vertical scanning operation when the sweep frequencies are controlled from characters reproduced at the unattended receiving station. When the battery at the receiver is first switched on the electron beam in the cathode ray tube will be directed toward the upper left corner of the viewing tube as indicated by the spot 120. The fields A and B in Figure 13 are shown rotated 180 degrees, or as they would appear on the mosaic at the transmitting tube; therefore the scanning would start from the lower right hand corner and progress toward the left and top in Figure 13. The electron ray will rest at this point 120, which may be an adjustable location outside of the normal picture area, since the horizontal and vertical deflecting condensers (like 67 Figure 7) have been charged to maximum potential, which would cause the electron ray to be deflected farther than normal. The discharge of these condensers is accomplished by modulating test pulses on the carrier by placing a test field or pattern in front of the transmitting tube. The light caused by the impact of the electrons at the spot 120 during the sending of one preliminary test field is directed through suitable lenses to the photo-tube 121, which is in parallel with the photo-tube 41 Figure 5, through conductors 122 and 123.

The sender or test pattern placed in front of the transmitting tube is similar to the reproduced picture or field in Figure 13 except that the top of the pattern would be dark gray in color, gradually fading to white at the center and from the center toward the lower edge it would gradually get darker and at the bottom of the pattern or chart it would be black, which is the same as the upper half of Figure 15. From the above it will be seen that the spot 120 would gradually vary in light intensity, which variations would give the first trigger pulse to the sweep control circuits of Figure 5. The function of by-pass condenser 124 and the resistance 125 is to prevent the operation of the sweep control circuits from high frequency pulses caused by scanning and also by gap or retrace between horizontal lines.

The test pattern, after an interval of a few fields, would be taken away from transmitting tube, but the reproduction of the marks or characters on the drum of Figure 3 would still continue during the sending and receiving of any other information.

The synchronizing systems whereby two distinct and different methods for keeping the receiving station in step with the transmitting station have been shown and described; one system makes use of a separate frequency transmitted from the sending station, while the other system uses characters transmitted as pictures. Both of these systems can be in operation at the same time from a single transmitter, whereby each type of receiving station can be utilized to receive the same message simultaneously, or either type of receiver can be prevented from receiving all or any part of a message. Furthermore the receiving station may at first be synchronized by a frequency modulated on a separate carrier and at any time subsequent thereto the frequency can be discontinued and then the receiver can be controlled from marks or characters in the picture.

With reference to Figure 14, I have shown another method of receiving radio signals originating from a cathode ray camera tube. As the picture shown in Figure 15 is placed in front of the camera tube its electron ray will scan an image of the designs or patterns for producing two pulses of current, one pattern occupying the upper half of the picture and the second pattern on the lower half of the picture. Each of these patterns is similar to the test pattern described in connection with Figure 13, and it is to be understood that a picture may contain one or any desired number of patterns.

The test patterns shown in Figure 15 will produce a frequency of 120 cycles per second with 60 fields per second.

From the above description it will be seen that many frequencies of current may be modulated on the carrier. At the receiving station the cathode ray tube and associated sweep generator circuits will not be required as shown in Figure 2. The output from the second detector Figure 2 is fed through a power amplifier 126, Figure 14, to a circuit having a tuned or harmonic relay 127, which is well known in the art, and as shown has a weighted or tuned armature 128 which responds only to a certain frequency. The condenser 129 will by-pass extremely high frequencies caused by the gap between lines or retrace interval. The vibration of the relay armature 128 from a suitable frequency caused by a particular pattern at the transmitting tube will close the circuit to slow release relay 130. This relay, in energizing, will place ground on conductor 131, extending back to relay 102 in the station control circuit, Figure 10, to hold the station in an operative condition, as previously explained.

The relay 127 will continue to vibrate its armature as long as the particular frequency is received. However, when placing a picture having more than two patterns in front of the transmitting tube a higher frequency current is obtained, which higher frequency current will operate the alternating current relay 132 in series with the resistance 133 and condenser 134, which are in resonance for this particular frequency and will not operate on the lower frequency. The relay 132 closes, through its spring contacts and the contacts of slow release relay 130, the circuit to the igniter 135 which may be placed in a bomb.

From the above description it will be seen that I have provided a novel system for generating at the will of the operator at the transmitting station various frequencies for controlling devices at a remote distance. Furthermore, as previously stated, the generation of sweep frequencies is not required to operate the apparatus of Figure 14. However, I have provided another method of selecting different circuits by transmitting the field frequency current to the receiving station. At the receiving station, by employing the circuits of Figure 9, the field frequency current may be supplied to relay 87. Relay 87 will operate to alternate from one circuit of Figure 14 through conductors 91 to another circuit of Figure 14 through conductors 92.

With reference to Figure 16 I have shown a system for producing various combinations of numbers or locations reproduced on the screen of a viewing tube. Horizontal rows are numbered from bottom up, and vertical columns are numbered left to right, and as shown, the black space 136 reading up and across would be forty-three and so on.

In Figure 16 I have shown two sets of figures of twenty-five numbers each. However in Figure 17 I have shown one set of figures but having 100 squares; the squares 137, indicated black, reading up and across would be seventy-three and ninety-six. Several of these squares may be used at one time and for various purposes. These symbols may be used for transmitting various forms of information. For instance, certain sets of numbers may explode bombs, others may control a robot vehicle, and still others may be used for telegraph or Baudet code symbols. The alphabet may be used similar to the method shown in which C is number 37, E is number 67, etc., giving an almost unlimited number of combinations.

Figure 20 shows still another arrangement in which the face of a clock is used and the numbers for code references are given by indicated time.

Figure 21 shows several separate areas for transmitting simultaneously several codes for different purposes, somewhat similar to Figure 16. For instance the large square 138 may be for the purpose of controlling some selective devices in the receiving station, also the location of the spot or mark 111 in Figure 12 for holding or releasing the receiver may be in this location. The other area may be used for other purposes as desired.

Figures 15, 16, 17, 20, and 21 show the patterns or frames as they are reproduced at the viewing tube. It is to be understood that these will be reversed at the transmitting tube on account of the lens system.

The numeral 139, Figure 16, shows a side view of the framework for producing the desired images upon the mosaic of the camera tube. This structure consists of very thin material placed together forming hollow squares, one hollow square for each two number location; such as the location forty-three is a hollow square represented by the numeral 136, etc. The numeral 140 represents a square peg having a black face. These pegs are placed in the hollow squares when it is desired to transmit some certain square areas as black and others as white.

At the unattended stations using this code system for controlling robots or explosives, I provide photocells such as 141 and 142, Figure 17, for each location naught eight and naught nine that is to be used for governing the time of the explosion of a bomb or a mine. Either of these photocells may be substituted for the photocell 112 in the circuit of Figure 11. With reference to Figure 18 I have shown two relays 143 and 144, either of which may be substituted for the relay 115 in a circuit similar to Figure 11. Light directed from location naught eight and naught nine into photo tubes 141 and 142 respectively will operate the springs of relays 143 and 144 to close the circuit to the igniter 145.

In Figure 19 I have shown three relays 146, 147 and 148, each of which may be connected in a circuit with the photocells 149, 150 and 151 respectively of Figure 20, each circuit similar to that of Figure 11. Photocells 149 and 151 receiving light from their respective areas will operate their associated relays 146 and 148. However, photocell 150 being placed before a dark area will not operate relay 147 which is the condition for closing the circuit to the igniter 152. The circuit of Figure 19 prevents an all-white screen from closing the circuit to the igniter.

From the above description of Figures 16 to 21 inclusive it will be seen that a large number of combination of stations with different station equipment may be worked out.

The circuit shown in Figure 22 is for controlling the steering mechanism of vehicle equipment by televising certain signs or symbols.

With reference to Figure 23 which shows reproduced characters on the viewing tube 24, the spot 153 which has been transmitted as white reflects light into its associated photocell 154. This photocell in a circuit similar to that of Figure 11 will operate its relay 155 Figure 22 to place ground through its spring contacts 156 and over conductor 157 through relay 158 to battery 159. The relay 158 will close its contacts and place ground on its winding through contacts 160, 161 and 162, thus holding relay 158 in energized position which is the proper condition for the vehicle to move straight ahead. The relay 158 will remain locked up until such time as either relay 163 or 164 is energized to control a turn to the left or a turn to the right, at which time the operator at the transmitter would rotate the black faced circular disk 165 Figure 24, which is in front of the pick up tube 1 Figure 1, by the handle 166. The rotation of this disk moves the white spot 167 to another location which will be reproduced at the viewing tube. It is assumed that the operator desired to direct the moving vehicle toward the right facing the direction of travel, which would place the light spot on the viewing tube at 168 Figure 23. Thus its associated photocell 169 would cause relay 170 in a circuit similar to Figure 11 to become energized, placing ground over conductor 171 through relay 164 to battery 159. Relay 164 will operate its spring contacts at 160 to open the circuit of relay 158, and close the steering motor power supply at contact 172 through resistance 173, right turn motor 174 and conductor 175 to the source of current. The steering motor 174 will run slowly, turning a rudder or other steering mechanism. Should it be desired to make the right turn faster by further rotating the disk 165, relay 176 or 177 would be energized in exactly the same manner as explained for the relay 164. The operation of the contact spring of relays 176 and 177 would cut out part or all of the resistance 173, allowing the motor 174 to increase its speed.

Should it be desired to turn left, the white spot 167 would be turned so that the light spot on the viewing tube would appear on the left side. This would actuate the left turn relays such as 163, which in turn would start the left turn steering motor 178 and run it slowly or rapidly depending upon the wishes of the remote operator. These left turn relays would be controlled in a similar manner described for the right turn relays.

With reference to Figure 25, I have shown a video or picture operated mechanism for remotely controlling or steering a vehicle. The numeral 179 represents a viewing tube secured to the vehicle in a vertical position which may be the tube 24 Figure 2. On top and in the center of this viewing tube is the base of a compass 180 having a needle 181. Secured on top of the compass needle 181 is a square tubing 182 having mirrors on the inside corners to direct a beam of light from the cathode ray screen to a photocell 183. On the opposite end of the compass needle is another square piece of tubing 184 provided with mirrors on the inside corners to direct a ray of light to a photocell 185, which is directly over the photocell 183.

Figure 27 shows a top view of the compass and the cathode ray tube 179.

Referring to Figure 26, I have shown a pattern on the viewing tube for controlling the operation of a vehicle. This pattern may be originated at the transmitting tube by having a similar design painted on the inner face of the disk 165 of Figure 24 which may be rotated in either direction to any degree or angle so that the control of the remote vehicle may be directed through any desired angle rather than in steps as described in Figure 22.

With reference to Figures 25, 26 and 27, the viewing screen or the top of the tube 179 is in a stationary horizontal position and may have a permanent mark 186 pointing to the front of vehicle. But the pattern on the screen can be rotated either clockwise or counter-clockwise. Let us assume that the compass and vehicle both point exactly north and that the pattern on the screen is as shown in Figure 26; then the opening in the tubing 182 would be over a dark area of the reproduced ring 187 and the opening in tube 184 would also be over a black area in the ring 187, in which case the vehicle would move straight north. Now suppose it is desired to go northeast. Then the design or pattern on the screen is rotated in a counter-clockwise direction to any angle which exposes the opening in tube 182 to a white or light area of the ring 187; this light upon reaching the photocell 183, will energize a relay 188 Figure 28 through a photocell circuit similar to that of Figure 11 and needs no further explanation. The relay 188, upon energizing, applies battery to the steering motor 189 which will operate to turn the vehicle, including the cathode ray tube 179, until the black area which is reproduced in under the openings in the tubings leading to both photocells 183 and 185. The compass needle 181, holding the tubing for directing ray of light to the photocells 183 and 185, remains practically stationary or pointing toward the north instead of pointing toward the front of vehicle. Should it be desired to move the vehicle in a northwest direction the pattern on the screen of the viewing tube would be rotated in a clockwise direction from the transmitting station which would allow photocell 185 to pick up a ray of light from the white surface reproduced. The photocell 185, upon finding light, would cause another relay 190 to become energized, closing the power supply to the left turn motor 191, which in turn will cause the vehicle and the tube 179 to turn until both photocells 183 and 185 fail to receive reflected light from the screen.

From the above description it will be seen that at whatever angle the picture or pattern on the viewing screen may be rotated, the vehicle will automatically adjust its motors to move the vehicle in the predetermined direction.

Referring to Figure 29, I have shown an automatic aligning device or object tracking mechanism which may be controlled by television. This device may be used for automatically controlling a gun carriage or for automatically controlling the direction of travel of the vehicle that the device is a part of.

The numerals 193 and 194 represent tubes or telescopes directing light onto ground glass screens, thence to photocells 195 and 196. When an object is within the focus range of the telescopes, such as that indicated by the line 197, the photocell 195 would not receive sufficient light to operate its associated relay 198; the photocell 196, receiving sufficient light would cause its associated relay 199 to be energized, by circuits similar to those of Figure 11, through battery connected by the energizing of relay 200, which relay is controlled by a spot or location on the viewing tube as shown in Figures 16 or 17. The relay 199, upon energizing, will close the battery supply to the directing control motor 201 through its contacts 202. This motor will operate to cause the carriage, not shown, to rotate counter-clockwise until such time that the telescope 194 moves in line with the object 197. Whereupon relay 199 will be released. When both relay 198 and 199 are in an unoperated position, battery through contacts 203 and 204 is closed to the spring 205 of relay 206. The relay 206 is controlled by a spot or location on the viewing tube similar to those shown and described in connection with Figure 16. The operation of relay 206 under the control of a remote control operator will close the battery supply to an ignitor or firing mechanism over the conductor 207. Thus, when both telescopes are directed toward an object neither the left turn or direction control motor 201 or the right turn or direction control motor 208 will operate and the vehicle may continue to travel toward the object or guns may be kept pointing toward the object.

From the above description it will be seen that a vehicle may have several methods or types of control, each of which may be operated independently of the other. For illustration, suppose the operator at the transmitting station may be operating a vehicle by the means shown in Figure 22, and then at his own option he may switch the control of the vehicle to the means shown in Figure 29.

I do not intend that the present invention shall be restricted to the arrangement of parts or to the particular form as herein set forth, but contemplate all modifications and changes therein within the terms of the appended claims.

Having thus described my invention, I claim:

1. In a distant control system, a transmitting station, a plurality of mobile receiving stations, each of the said mobile stations having at least two motors responsive to received signals for steering its associated mobile station carrying vehicle, means at said transmitting station including a first multi-position member to transmit first signals during any one of a number of periodic intervals, according to the position of said member, to select a desired mobile station for the reception of control signals, said last means including a second operable member to transmit said control signals in successive rotation with said first signals for controlling said motors at the selected mobile station, thereby steering the vehicle carrying the selected mobile station.

2. In a distant control system, a transmitting station, a plurality of mobile receiving stations, each of the said mobile stations having at least two motors responsive to received signals for steering its associated mobile station carrying vehicle, means at said transmitting station including a first multi-position member to transmit first signals during any one of a number of periodic intervals, according to the position of said member, to select a desired mobile station for the reception of control signals, said last means including a second multi-position member to transmit different sets of said control signals in successive rotation with said first signals to actuate either one of the said motors at the selected mobile station at different speeds, according as said second member is moved to different positions in a clockwise or a counter-clockwise direction, to thereby steer the vehicle carrying the selected mobile station at variable speeds.

3. In a distant control system, a transmitting station, a plurality of mobile receiving stations, each of the said mobile stations having at least two motors responsive to received signals for steering its associated mobile station carrying vehicle, means at said transmitting station including a first multi-position member to transmit first signals during any one of a number of periodic intervals, according to the position of said member, to select a desired mobile station for the reception of control signals, object-tracking mechanism in the selected mobile station, said last means including a second operable member to transmit said control signals in successive rotation with said first signals to condition said motors at the selected mobile station for selective rotation under control of object tracking mechanism at the selected station to thereby steer the vehicle carrying the selected mobile station toward an object.

4. In a distant control system, a transmitting station, a plurality of mobile receiving stations numerically designated, each of the said mobile stations having at least two motors responsive to received signals to steer the receiving station carrying vehicle, means at each of the said stations to produce two series of timing waves, each timing wave in each series having portions numerically designated, means at said transmitting station to produce synchronizing signals for controlling the timing waves produced thereat, transmitter means to transmit said signals for controlling the timing waves produced at each of the said mobile stations, means at said transmitting station including a first multi-position member to select, according to the position of said member, certain portions in the timing waves produced thereat representative of the number for a called mobile station, thereby selecting a recurring period of time for the called mobile station to receive signals, means forming a part of said transmitter means to transmit other signals during said recurring period to select said called mobile station for the reception of control signals, and means including a second operable member forming another part of said transmitter means to transmit said control signals in successive rotation with said other signals for controlling said motors at the called station thereby steering the vehicle carrying the called mobile station.

5. In a distant control system, a transmitting station, a plurality of mobile receiving stations numerically designated, each of the said mobile stations having at least two motors responsive to received signals to steer the receiving station carrying vehicle, means at each of the said stations to produce two series of timing waves, each timing wave in each series having portions numerically designated, means at said transmitting station to produce synchronizing signals for controlling the timing waves produced thereat, transmitter means to transmit said signals for conrolling the timing waves produced at each of the said mobile stations, means at said transmitting station including a first multi-position member to select, according to the position of said member, certain portions in the timing waves produced thereat representative of the number for a called mobile station, thereby selecting a recurring period of time for the called mobile station to receive signals, means forming a part of said transmitter means to transmit other signals during said recurring period to select said called mobile station for the reception of control signals, and means including a second multi-position member forming another part of said transmitter means to transmit different sets of said control signals during different recurring periods to actuate either one of the said motors at the called mobile station at different speeds, according as said second member is moved to different positions, in a clockwise or counterclockwise direction, at variable speeds.

6. In a distant control system, a transmitting station, a plurality of mobile receiving stations numerically designated, each of the said mobile stations having at least two motors, responsive to received signals, to steer the receiving station carrying vehicle, means at each of the said stations to produce two series of timing waves, each timing wave in each series having numerically designated portions, means at said transmitting station to produce synchronizing signals for controlling the timing waves produced thereat, transmitter means to transmit said signals for controlling the timing waves produced at each of the said mobile stations, means at said transmitting station including a first multi-position member to select, according to the position of said member, certain portions in the timing waves produced thereat representative of the number for a called mobile station, thereby selecting a recurring period of time for the called mobile station to receive signals, means forming a part of said transmitting means to transmit other signals during said recurring period to select said called mobile station for the reception of control signals, object-tracking mechanism at said called station, and means including a second operable member forming another part of said transmitter means to transmit said control signals in successive rotation with said other signals to condition said motors at the selected mobile station for selective rotation under control of said object-tracking mechanism at the called station to thereby steer the vehicle carrying the selected mobile station toward an object.

7. In a distant control system, a transmitting station provided with a number of code senders, a plurality of numbered mobile receiving stations, each of the said mobile stations having a number of groups of apparatus and associated circuits responsive to received signals, one group comprising steering motors for the receiving station, another group comprising direction control motors for maintaining said vehicle trained on a moving object, means at each of the said stations to produce two series of timing waves, each timing wave in each series having numbered portions, means at said transmitting station to produce synchronizing signals for terminating the timing waves produced thereat, means to transmit said signals for terminating the timing waves produced at said mobile stations, means at said transmitting station to select certain portions in the timing waves produced thereat representative of the call number of a desired mobile station, means at said transmitting station to produce a carrier wave, means at said transmitting station to modulate said carrier wave with other signals during a recurring period of time determined by the selected portions in said timing waves to select the said desired station for the reception of control signals, means at said transmitting station including said code senders to modulate said carrier wave with different sets of control signals in sequence, one set of said control signals controlling said steering motors to steer said vehicle toward a certain object, a second set of said control signals to condition said direction control motors for control by object tracking mechanism in said mobile station, thereby maintaining said vehicle traveling toward said object.

8. In an automatic control system, a transmitting station for transmitting control signals, a plurality of mobile receiving stations, each capable of utilizing said signals, for each mobile station a plurality of motors adapted to be controlled by said signals, means for altering said signals to select any number of said mobile stations to receive said signals, and means for further altering said signals to selectively operate said motors at the selected mobile stations.

9. In a system of distant control, a transmitting station, a plurality of numbered receiving stations each comprising a cathode ray tube having an image screen, said tubes provided with suitable apparatus and associated circuits for producing on their associated screens images from picture signals received from said transmitting station, means at said transmitting station to transmit in receiving periods representative of a receiving station number signals to select, exclusive of all other stations, one of said receiving stations to receive said picture signals, a rotatable motor at the selected receiving station, and means responsive to said picture images for controlling said motor.

10. In a system of distant control, a transmitting station, a mobile receiving station having a number of sets of apparatus and associated circuits responsive to received signals, said apparatus comprising steering motors for the mobile station carrying vehicle, object-tracking mechanism having direction control motors for maintaining said vehicle directed toward a moving object, and a normally open ignition circuit for an explosive, means at said transmitting station including a number of movable members to transmit different sets of recurring control signals during different recurring periods of time, one set of said control signals controlling said steering motors to steer said vehicle toward a certain object, a second set of said control signals to cause said direction control motors to be controlled by said object-tracking mechanism to maintain said vehicle traveling toward said object, and a third set of said control signals to close said ignition circuit in cooperation with mechanism.

11. In a system of distant control, a transmitter station, means at said station to produce picure signals, means at said station to produce synchronizing signal pulses, means associated with said station to transmit said picture signals and said signal pulses, a cathode ray tube having an image screen and an electron ray directed toward said screen, means for causing the electron ray, under control of said signal pulses, to scan said screen to produce on said screen images from said picture signals, means for changing the control of the scanning actions from received signal pulses to control the scanning actions from changing light values in the images on said screen, a motor, and means sensitive to light from the said images for causing said motor to rotate.

12. In a system of distant control, a transmitting station, a plurality of receiving stations each comprising a cathode ray tube having an image screen, said tubes provided with suitable apparatus and associated circuits for producing on their associated screens images from picture signals received from said transmitter, manually operable means at said transmitting station for changing the signals, thereby to select any one of the said reeciving stations, exclusive of all other stations, to receive said picture signals, an electrical motor for the selected receiving station, and photoelectric devices responsive to different intensities of light in the images on the screen of the selected receiving station to drive said motor.

13. In a system of distant control, a plurality of cathode ray viewing tubes each provided with an image screen, a receiver for each of the said tubes, each of the said receivers provided with apparatus and suitable circuits for producing on its associated screen images from received picture signals, a holding and release point in different locations on each of the said screens for reflecting light, for each of the said receivers a photo-electric device sensitive to different intensities of light from the said holding and release point on the receiver's associated screen whereby any one of the said receivers may be maintained in operation while the others are rendered inoperative, said images having a pattern in different locations in successive images on the screen in the selected said one receiver, a pair of electric motors, a source of current supply, photoelectric cells sensitive to light from different locations of the said pattern in said one receiver, and means controlled by said photoelectric cells for electrically connecting the said source of current supply to the said motors.

14. In a system of distant control, a plurality of receiving stations each having a rotatable member, a transmitting station, an electrical oscillator at said transmitting station to produce a carrier wave capable of reception at all of the said receiving stations, means to transmit said carrier wave, a signaling device having a rotatable element, means at said transmitting station including said device to produce different sets of control signals according as said element is rotated, the signals for each of the said sets of control signals occurring at periodic spaced intervals, and means to modulate said carrier wave with said different sets of control signals to selectively actuate each of the said members.

15. In a distant control system, a transmitting station, a plurality of radio receiving stations each having a rotatable member, an electrical oscillator at said transmitting station to produce a carrier wave capable of reception at all of the said receiving stations, means to transmit said carrier wave, a signaling device at said transmitting station having a movable element, and means including said device to modulate said carrier wave with different sets of signaling currents, according as said element is moved, to selectively actuate each of the said members, the current for each of the said sets of signaling currents occurring at periodic intervals.

16. In a system of distant control, a plurality of numerically designated radio receiving stations each having a rotatable member, a transmitting station, an electrical oscillator at said transmitting station to produce a carrier wave capable of reception at all of said receiving stations, means to transmit said carrier wave, a signaling device at said transmitting station comprising movable elements and suitable circuits to produce first control signals according as a first one of said elements is moved for the call designation of a first one of said receiving stations, said first control signals occurring at periodic spaced intervals, means to modulate said carrier wave with said control signals to signal said one receiving station, said device to produce second control signals according as a second one of said elements is moved, said last means to modulate said second control signals on said carrier wave to cause rotation of said member associated with said one receiving station.

17. In a system of distant control, a transmitting station, a plurality of mobile receiving stations, each of said receiving stations provided with a rotatable member capable of being selectively actuated by different sets of received control signals, means at said transmitting station to produce a carrier wave, means to transmit said carrier wave, means comprising a rotatable device with suitable circuits at said transmitting station to produce said different sets of control signals, the signals for each of the said sets of control signals occurring at periodic spaced intervals, and means to modulate said carrier wave with said different sets of control signals, during a different recurring period of time for each set of signals, to selectively actuate said members.

18. In a system of distant control, a radio transmitting station, a plurality of receiving stations, means at each of said stations to produce a series of saw tooth waves, each of the said saw tooth waves having numerically designated portions indicating receiver station numbers, means at said transmitting station to transmit, during a recurring period of time corresponding to a selected portion of said saw tooth waves, signals to select one of said receiving stations, exclusive of all other stations, to receive other signals, a rotatable motor at the said selected station, and operable means to cause transmission of said other signals to control said motor.

19. In a system of distant control, a transmitting station, a plurality of receiving stations, each of the said receiving stations provided with a rotatable member capable of being selectively actuated by different sets of received control signals, for each of the said receiving stations an operable device under control of its associated member, and at said transmitting means including a rotatable element to transmit a number of sets of control signals during different periodic intervals to actuate selectively said members thereby to actuate selectively said devices.

20. In a distant control system, a transmitting station, a plurality of mobile receiving stations, each of the said receiving stations comprises a number of control motors responsive to received signals, means at said transmitting station including movable members to transmit different sets of control signals during different periodic intervals, a first set of said control signals to cause operation of at least one of the said motors at each of the said receiving stations, and a second set of said control signals to cause one of said operating motors to change its speed relative the speed of the other said operating motors.

21. In a distant control system, a transmitting station, a plurality of mobile receiving stations, each of the said receiving stations comprises a number of motors responsive to received signals, means at said transmitting station including manually operable devices to transmit a number of sets of recurring control signals, during different recurring periods of time, the signals for each of the said sets of recurring control signals occurring at periodic spaced intervals, means at said receiving station to receive said sets of control signals to start, stop and control the speed of the said motors as desired.

22. In a system of distant control, a transmitting station, a mobile receiving station having a number of motors, certain of said motors responsive to received control signals for steering the receiving station transporting vehicle, means at said transmitting station including operable devices in selected positions to transmit during different recurring periods of time said control signals to control certain of the said motors, thereby to steer said vehicle on a selected course, the signals for each set of said control signals occurring at periodic spaced intervals, and automatic direction control mechanism in said receiving station, following steering to the selected course, to control other of said motors to maintain said vehicle traveling on the selected course.

23. In a system of distant control, a receiving station having a rotatable member, a transmitting station, an electrical oscillator at said transmitting station to produce a carrier wave capable of reception at said receiving station, means to transmit said carrier wave, at said transmitting station a signaling device having a manually rotatable multi-position element and suitable circuits to produce different sets of control signals according as said element is rotated to different positions, the signals for each of the said different sets of control signals occurring at periodic spaced periods of time, means to modulate said carrier wave with said different sets of control signals, and means at said receiving station to demodulate said carrier wave to cause a certain rotation of said member for one set of said control signals and a different rotation of said member for another set of said control signals.

24. In a system of remote control, a transmitting station, means at said station including a plurality of signal sending devices to transmit during different recurring periods of time a plurality of groups of recurring control signals, the signals for each of the said groups of recurring control signals occurring at periodic spaced intervals, a receiving station, means at said receiving station to receive said groups of recurring control signals, a plurality of different sets of relays at said receiving station, each of the said different sets of relays responsive to a different one of the received said groups of control signals to actuate certain of said relays, and manually operable means forming a part of one of said devices for altering the recurring period for transmitting the control signals in one of the said groups of control signals for selectively actuating the relays in one of said sets of relays independently of the relays in the other said sets.

25. In a system of remote control, a radio transmitting station, first means at said station including at least a first manually operable member to transmit a first set of recurring control signals during a first recurring period of time, the signals for said first set of recurring control signals occurring at periodic spaced intervals, a radio receiving station supported in a moving vehicle, a pair of motors for steering said vehicle, second means at said receiving station to receive said first set of recurring control signals, and means including first electrical devices at said receiver station responsive to the received said first set of recurring control signals to cause one of said motors to be actuated to steer said vehicle toward a certain object.

26. A system of remote control as claimed in claim 25, comprising in addition a second manually operable member forming a part of said first means to transmit a second set of recurring control signals, said second means to receive said second set of recurring control signals, a path control compass supported in said vehicle having a pair of path control motors for controlling said vehicle, and means including second electrical devices at said receiving station responsive to the received said second set of recurring control signals to cause one of said path control motors to be actuated for a period of time as determined by the direction of movement of said vehicle relative said path control compass to steer said vehicle in a predetermined direction.

27. A system of remote control as claimed in claim 25, comprising in addition a second manually operable member forming a part of said first means to transmit a second set of recurring control signals during a second recurring period, said second means to receive said second set of recurring control signals, object-tracking mechanism supported in said vehicle having direction control motors for controlling said vehicle, and means including second electrical devices at said receiving station responsive to the received said second set of recurring control signals to cause said direction control motors to be controlled by said object-tracking mechanism to maintain said vehicle traveling toward said object.

28. A system of remote control as claimed in claim 25 wherein said first means comprises a first cathode ray tube to transmit during a second recurring period picture signals representative of a scene, said second means to receive said picture signals, and a second cathode ray tube forming a part of said receiving station, said second tube responsive to the received said picture signals to produce facsimile images of said scene.

29. A system of remote control as claimed in claim 25 wherein said first means comprising a first electrical device to transmit other signals during a second recurring period, said second means to receive said other signals, and a second electrical device, forming a part of said receiving station, actuated in response to the received said other signals.

30. A system of remote control as claimed in claim 25, comprising in addition a second manually operable member forming a part of said first means to transmit a second set of recurring control signals during a second recurring period, said second means to receive said second set of recurring control signals, a normally open ignition circuit for explosives associated with said vehicle, and means including second electrical devices at said receiving station responsive to the received said second set of recurring control signals to close said ignition circuit.

31. A system of remote control as claimed in claim 25, comprising in addition second and third manually operable members forming a part of said first means to transmit a second set and a third set of recurring control signals during second and third recurring periods, said second means to receive said second set and said third set of recurring control signals, object-tracking mechanism supported in said vehicle having direction control motors for controlling said vehicle, means including second electrical devices at said receiving station responsive to the received said second set of recurring control signals to cause said direction control motors to be controlled by said object-tracking mechanism to maintain said vehicle traveling toward said object, a normally open ignition circuit for explosives associated with said mechanism, and means including other electrical devices at said receiving station responsive to the received said third set of recurring control signals to close said ignition circuit in cooperation with said mechanism.

32. In a system of remote control, a transmitting station, means at said station to produce a carrier wave, means at said station including a multi-position member to produce a number of different sets of recurring control signals according as said member is moved to different positions, the signals for each of the said sets of recurring control signals recurring at periodic spaced periods of time, means at said station to transmit said different sets of recurring control signals modulated on said carrier wave during different recurring periods of time, a radio receiving station supported in a moving vehicle, a pair of motors for steering said vehicle, means at said receiving station to receive said different sets of recurring control signals, and means including receiver station electrical devices responsive to the received said different sets of recurring control signals to cause said motors to be actuated independently according to the position of said member.

JOHN H. HOMRIGHOUS.

REFERENCES CITED

The following references are of record in the file of this patent:

UNITED STATES PATENTS

| Number | Name | Date |
|---|---|---|
| 1,747,664 | Droitcour | Feb. 18, 1930 |
| 2,207,716 | Bumstead | July 16, 1940 |
| 2,237,440 | Jones | Apr. 8, 1941 |
| 2,262,942 | Jones | Nov. 18, 1941 |
| 2,382,055 | Homrighous | Aug. 14, 1945 |
| 2,393,892 | Ganahl | Jan. 29, 1946 |
| 2,408,819 | Sorensen | Oct. 8, 1946 |
| 2,454,651 | Homrighous | Nov. 23, 1948 |